Oct. 12, 1954  C. KLEIN ET AL  2,691,432
BAKING OVEN WALL CONSTRUCTION
Filed Feb. 21, 1949  4 Sheets-Sheet 2
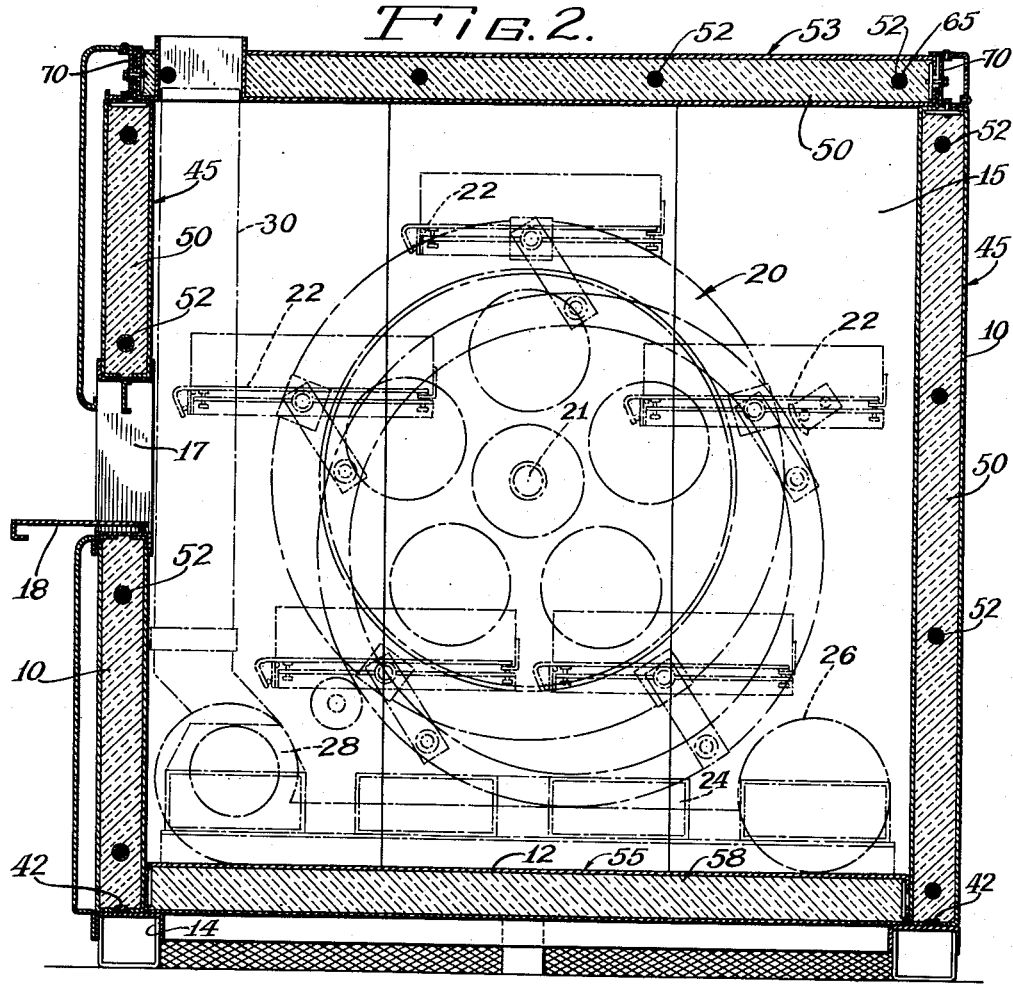
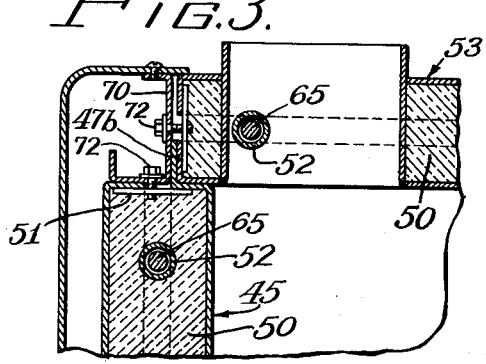
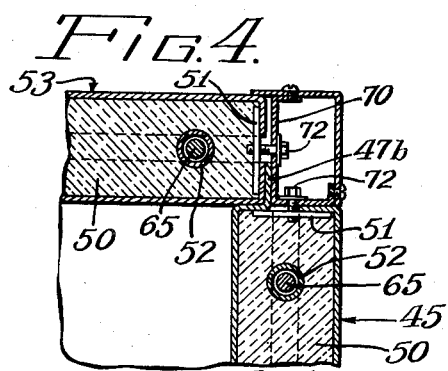
Inventors:
Chris Klein
Richard C. Skarin
William G. Tinker
By Bair & Freeman Attys.

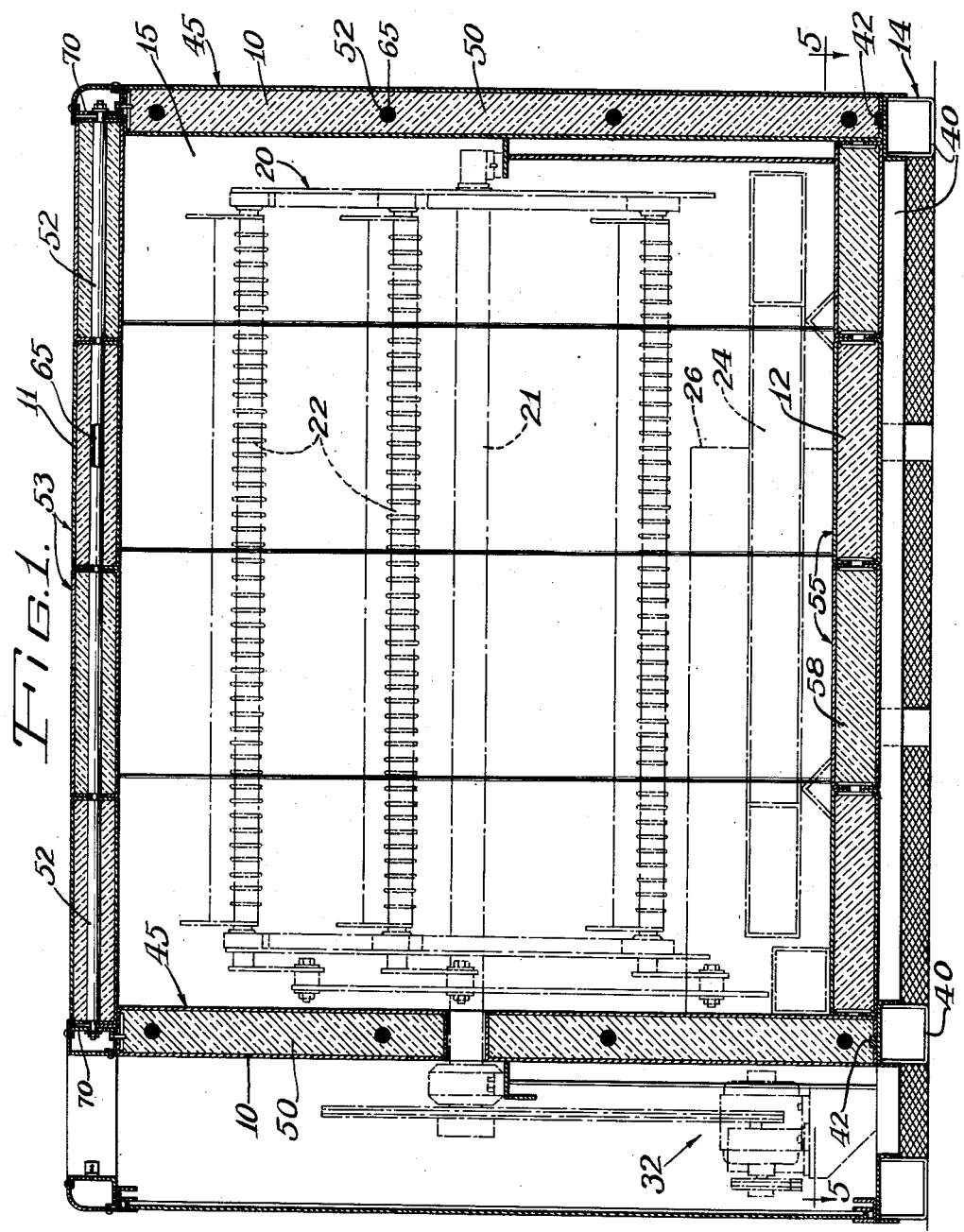

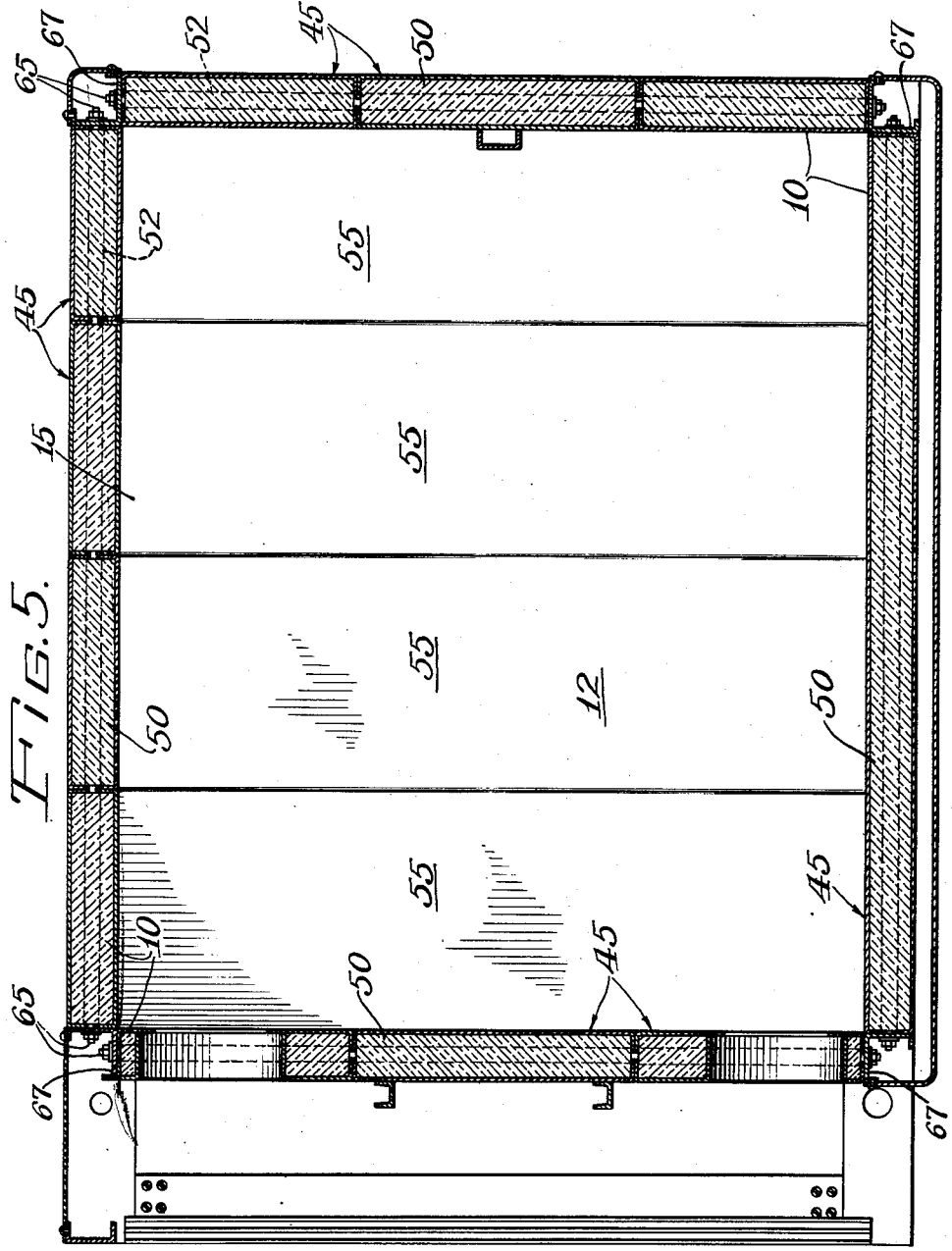

Oct. 12, 1954  C. KLEIN ET AL  2,691,432
BAKING OVEN WALL CONSTRUCTION
Filed Feb. 21, 1949  4 Sheets-Sheet 4
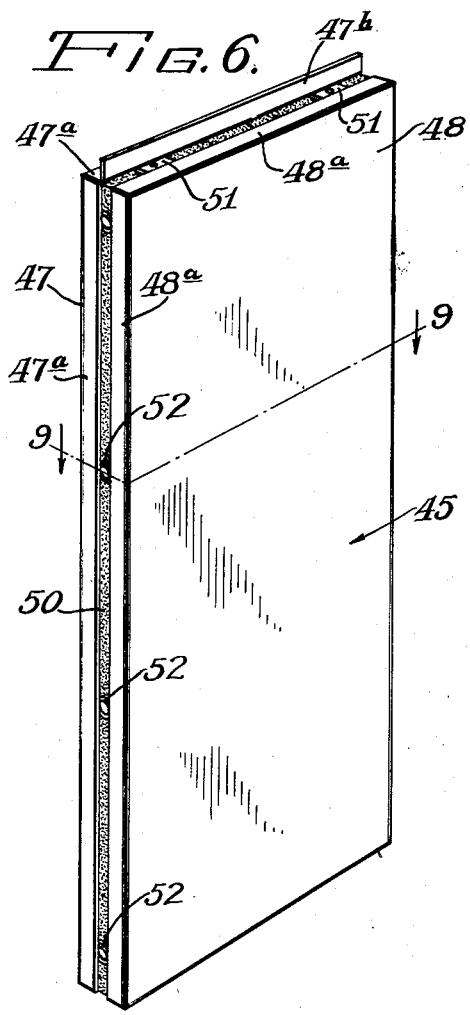
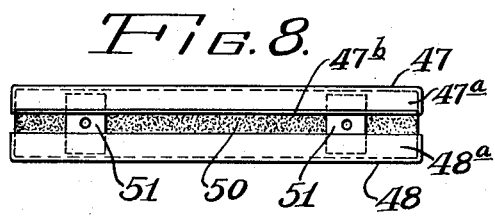
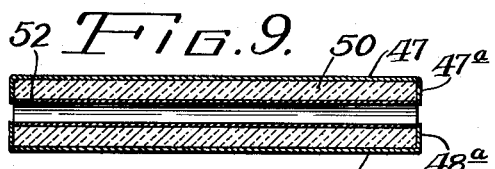
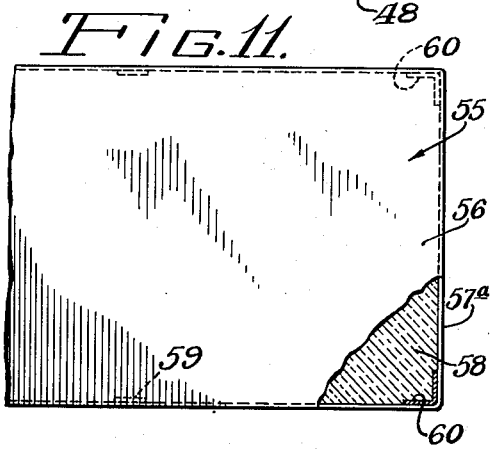
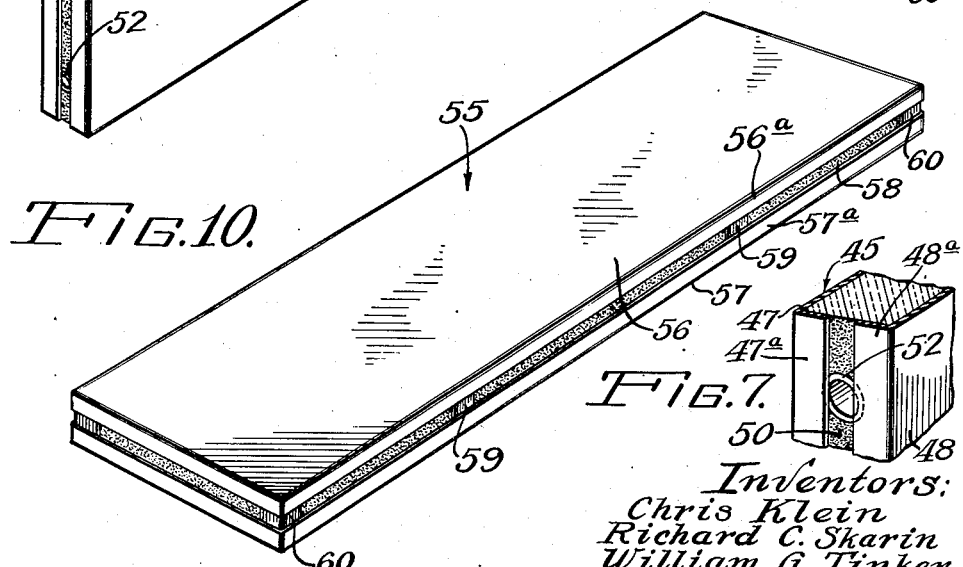
Inventors:
Chris Klein
Richard C. Skarin
William G. Tinker
By Bair & Freeman Attys.

Patented Oct. 12, 1954

2,691,432

UNITED STATES PATENT OFFICE 2,691,432

BAKING OVEN WALL CONSTRUCTION

Chris Klein, Warrenville, Richard C. Skarin, Western Springs, and William G. Tinker, Itasca, Ill., assignors to The Petersen Oven Company, Franklin Park, Ill., a corporation of Illinois Application February 21, 1949, Serial No. 77,522

2 Claims. (Cl. 189—34)

The present invention relates to baking ovens of the commercial type, having power driven means within the baking chamber for moving the foodstuffs or other materials to be baked therein from a loading station to an unloading station. Ovens of this general type are quite sizeable, occupying a substantial floor area and are relatively expensive.

At the present time, the usual practice employed in the manufacture of such ovens consists in producing various elements and components of the oven and assembling the same, that is, the major portion of such elements, in the factory as a complete oven, after which it is "knocked down" and shipped to the site for final assembly. In shipping the oven to a customer, the various sheet metal plates comprising inner and outer walls of the oven chamber are usually shipped flat, the frame members dis-assembled, and the insulation for use between the inner and outer walls is shipped in bulk. Ovens produced in this manner are in a sense individually tailored or produced, and the parts thereof usually are produced in limited quantity, sufficient for each particular order. Such practice results in relatively high cost, both in production and erection of the oven.

One of the principal objects of this invention is to provide a novel oven construction which lends itself to a form of mass production for various sub-assemblies, by virtue of which it is possible to eliminate "shop," pre-assembly of the oven, and which sub-assemblies may be shipped direct to the site for final and expeditious erection.

Another object is to provide an improved oven construction wherein the walled enclosure, providing the baking chamber, is formed of a plurality of unitary panel assemblies, each composed of an inner and outer wall disposed in spaced apart relation with a body of insulating material interposed therebetween.

A further object is to provide a novel and improved construction of walled enclosures for a baking oven which permits quick and easy assembly in the "field," and which effects great economies in both manufacture and erection.

Other objects and advantages of this invention will be apparent from the following description, taken in connection with the accompanying drawings in which:

Figure 1 is a vertical, transverse section through the oven, showing the various panel assemblies constituting the walls of the oven, and the conveying mechanism for moving the foodstuffs within the oven, while the same are being baked, is represented in dot and dash outline;

Figure 2 is a vertical section through the oven, taken at right angles to the section shown in Figure 1;

Figures 3 and 4 are enlarged, fragmentary views of the upper left and right hand corners, respectively of the oven, as seen in Figure 2 of the drawing, indicating the manner of connection of the top wall to the side walls of the oven;

Figure 5 is a horizontal, sectional view through the oven, taken substantially as indicated at line 5—5 on Figure 1;

Figure 6 is a perspective view of a panel assembly for use in producing side walls of the oven;

Figure 7 is an enlarged, fragmentary, perspective view of an edge portion of the panel represented in Figure 6;

Figure 8 is a top view of the panel shown in Figure 6;

Figure 9 is a transverse, sectional view taken substantially as indicated at line 9—9 on Figure 6;

Figure 10 is a perspective view of one of the panel elements for producing the bottom wall of the oven; and Figure 11 is a fragmentary plan view of the panel shown in Figure 10, with portions broken away to show details of construction.

In the drawings the present invention is represented as embodied in a walled enclosure for a "Reel" type baking oven. The walled enclosure comprises four side walls 10, a top wall 11, and a bottom wall 12, supported on a unitary base frame structure indicated generally at 14. The walled enclosure defines a baking chamber 15, and in the front side wall 10, as clearly seen in Figure 2 of the drawings, there is provided a suitable opening 17, extending substantially the length of said side wall, through which panned foodstuffs are passed into and removed from the baking chamber 15. The opening 17 is normally closed by a suitable door, indicated generally at 18.

For purposes of a better understanding of the present invention, the mechanism within the oven chamber for handling of foodstuffs and for effecting baking of the panned foodstuffs or other materials to be baked, together with drive mechanism, all shown in dot and dash outline, will be briefly described, although it does not form a direct part of the present invention. Within the oven chamber 15 is a reel structure indicated generally at 20, adapted to be rotated about an axis indicated at 21. The reel includes a plurality of elongated trays 22 adapted at the time of loading and unloading, to be registered with the opening 17 for the placement of panned foodstuffs thereon, or for removal therefrom. In ovens of this type, after all of the trays have been loaded, the door 18 is closed and the reel structure is rotated for a pre-determined period of time for effecting a baking of the panned foodstuffs. The trays are so mounted as to remain in a substantially horizontal, stabilized position during their entire course of travel within the baking chamber. In the lower portion of the baking chamber is a heat exchanger unit indicated at 24, one end of which is connected to a source of heat supplied by a heater unit indicated at 26, and the opposite end being connected with a blower indicated generally at 28. The blower is connected by suitable ducts for returning a portion of the heat from the heat exchanger to the heater, and for by-passing a portion of the heat from the heat exchanger to a vent stack indicated at 30. The reel 20 may be driven by any suitable mechanism and the drive therefor is indicated generally at 32, disposed outside the oven wall, as may be seen in Figure 1 of the drawings.

As may be seen in Figures 1 and 2 of the drawings, the base frame 14 is a unitary, built-up, structural component having box-like members 40, interconnected to form a rectangular outline, corresponding substantially to the contour of the walled enclosure of the oven. Mounted on the upper surface of these box-like structures, as may be clearly seen in Figures 1 and 2 of the drawings, are elongated cleats 42, extending substantially the length of the respective side walls of the oven, adapted for interlocking engagement with the unitary panel components of the side walls 10 of the walled enclosure, as will hereinafter be described.

With the exception of the front side wall, as seen in Figure 2 of the drawings, the side walls 10 are essentially of the same construction. The side walls are each composed of a plurality of prefabricated panel components or assemblies indicated generally at 45. Each of these panel assemblies is composed of a pair of elongated sheet metal plates 47 and 48 of substantially identical size, and constituting inside and outside walls respectively of the enclosure. Each of these plates have their marginal portions bent at right angles to form flanges 47a and 48a, forming pan-like elements. These plates are disposed in cooperating relation with their respective flanges extending toward each other in spaced apart, substantially aligned relation, and enclosed therebetween is a body of heat insulating material 50. For convenience in manufacture, we preferably employ two separate bats of heat insulating material, placing one in each of the respective plate elements 47 and 48. Before disposing said plate elements with their bats of insulating material therein, in cooperating relation, a plurality of metallic tubular elements 52, herein shown as pipe sections, are positioned between the bats of insulating material, with the ends of said pipes abutting against and welded to the inner surfaces of the flanges 47a and 48a, as seen in the drawings. These pipes which extend transversely of the panel assembly, extend substantially horizontally, and are disposed in vertically spaced apart, parallel relation, as seen in Figure 6 of the drawings. Said pipes serve as spacers in the assembly of the two sheet metal plates, as well as the means for connecting said plates together as a unit with the body of insulation therebetween, and further serve as guideways for tie-rods to be hereinafter described. It is to be understood that the tubular elements need not necessarily be pipes, but may be of any other suitable construction such as sheet metal tubular elements.

Positioned against the inner surfaces of the flanges 47a and 48a of the respective sheet metal elements at the upper end of the panel assembly are spacer bars or straps 51 welded to the respective flanges. These spacer bars serve to connect said upper end of the sheet metal elements firmly together, in proper spaced apart relation and said bars are drilled and tapped for the reception of bolts as will hereinafter be described. The upper end of the sheet metal panel 47 has its corresponding flange 47a continuing into an upwardly extending mounting flange 47b.

It is to be understood that the panel elements, constituting the front side wall and provided with the opening 17 may be of a construction generally similar to that represented in Figure 6 with the exception of reduction in height to provide the opening 17.

The panel assemblies comprising the top wall or roof 11 and indicated at 53 may be understood to be identical in construction with that represented in Figure 6 of the drawings with the exception that the flange 47b at the upper end is omitted, and tapped spacer bars 51 are provided at both ends.

The panel assemblies comprising the bottom wall 12 are indicated generally at 55 and are represented in Figures 10 and 11 of the drawings. Each of said panel assemblies comprises a pair of spaced apart, elongated plates 56 and 57 having their marginal portions bent to form right angularly extending flanges 56a and 57a respectively. These plates embrace therebetween a body of heat insulating material 58 similarly to that embodied in the side wall panel construction 45. The plates 56 and 57 are secured together in spaced apart relation by a plurality of spacer bars 59 welded to the respective flanges 56a and 57a of said plates for spacing said plates apart the desired predetermined distance and for rigidly connecting the plates together with the insulating material therebetween as a unitary assembly. The bars at the respective corners of the assembly, as indicated at 60 are preferably of angular formations for rigidifying the connections of the corner portions of the respective plates in assembled relation with respect to each other.

It will now be apparent that the respective panel assemblies may be prefabricated at the factory and may be shipped to the site for assembly and erection in conjunction with other components. As may be seen in the drawings, the panel elements 45, in forming a side wall, are positioned in an edgewise abutting relation and mounted in upright position on the base frame 14. The spacing of the flanges 47a and 48a at the lower end of said panel assemblies is such as to constitute a keyway for the reception of the cleat elements 42 on said base frame structure and thus serve to key or lock the lower ends of the panel assemblies in position on the base frame. After a proper number of such panel assemblies are positioned on the base frame to constitute one of the side walls, said panel assemblies are connected as a unit to constitute a unitary wall by means of a plurality of tie-rods 65 which extend through aligned sets of tubular elements 52. Positioned against the exposed edge of the outermost panels, and rigidly secured thereto by said tie-rods are upright frame members 67 of angular formation, as seen in Figure 5 of the drawings, with the respective legs of said members constituting the corner connections for the two adjacent side walls. Thus by virtue of the tie-rods, the series of panels constituting the respective side walls are securely connected together as units and which, by virtue of the upright frame members 67 at the corners, serve as the connecting medium between the adjacent side walls.

The panel assemblies 53 comprising the roof or top wall wall are positioned as may be seen in Figures 1 to 4 of the drawings with their end portions resting upon the top of the respective panels 45 of the side walls, and with their ends, as may be seen in Figures 3 and 4 of the drawings, abutting against the upwardly extending flanges 47b of said panel assemblies 45. The panels comprising the top wall or roof are rigidly connected to the panels comprising the side walls by horizontally extending frame members 70 of generally angular form with one leg thereof seated upon the panel assemblies 45 and the other leg extending upwardly and positioned against the outer surface of the upstanding flange 47b of said panels 45. Said frame member is rigidly attached to the respective side wall panels and roof panels by means of bolts 72 threaded into the respective spacer bars 51 provided in the respective panel assemblies. The top frame members 70 also extend parallel with and extend the length of the roof panel assemblies and are rigidly attached to the roof panel assemblies by the tie-rods 65 extending through the upright leg of said frame members 70, the horizontal leg of said frame members being attached to the upper ends of the side wall panel assemblies by bolts, as above described. By virtue of the construction described the side walls and roof or top wall become an integrated, rigid structure, supported firmly on the base frame 14.

The bottom wall 12 of the oven is composed of a plurality of panel assemblies 55 which are positioned side-by-side in edgewise abutting relation, with their marginal portions supported upon the box-like members 40 of the base frame structure, and with the outer edges terminating in close proximity to the inner surfaces of the panel elements of the side walls. The panel elements constituting the bottom wall are preferably dimensioned for loose fitting in position, so as to permit limited expansion due to the close proximity thereof to the heat exchanger structure 24.

In the assembly of an oven embodying the present invention two or three adjacent side walls may first be erected and the floor or bottom wall placed in position. The mechanical apparatus of the oven may be then mounted in position, after which the fourth side wall may be placed in position as well as the top wall for completing the total oven.

In baking ovens of the type herein involved, it has been found desirable to introduce a predetermined amount of live steam into the baking chamber to insure obtaining desired baking characteristics of the foodstuffs. Hence, to insure against escape of steam, as well as heat, suitable cement may be employed at the joints of the various roof panels and the side wall panels of the oven chamber.

It will be apparent that by virtue of the construction described, great economies are effected by the prefabrication of the various panel elements as sub-assemblies and dispensing with the necessity of pre-assembling of the various elements and components in the shop prior to shipment to the site for final erection. Furthermore, great economies are effected in the actual erection of an oven employing panel wall assemblies of the type embodying the present invention. The respective panel elements may be quickly and easily placed in position and connected together to comprise the respective walls forming the wall enclosure of the oven.

Although we have herein shown and described a preferred embodiment of our invention, manifestly it is capable of modification and rearrangement of parts without departing from the spirit and scope thereof. We do not, therefore, wish to be understood as limiting this invention to the precise form herein disclosed, except as we may be so limited by the appended claims.

We claim as our invention:

1. A prefabricated panel unit for a wall of a baking oven, comprising a pair of polygonal sheet metal plates having their marginal edges bent to form flanges and thereby defining pan-like elements, said plates being positioned in cooperating relation with their flanges extending toward each other in substantially aligned spaced-apart relation, bats of heat insulating material fitted into said pan-like elements and abutting each other, and a plurality of spaced-apart, tubular metallic members positioned between said elements and bats and rigidly connected at their ends to sets of aligned flanges, at opposite edges of said elements to constitute guideways for tie-rods and for securing said elements together, in such spaced apart relation, and with the openings of said members disposed in registration with the spaces between the flanges of said elements.

2. A prefabricated panel unit for a wall of a baking oven comprising a pair of polygonal sheet metal plates having their marginal edges bent to form flanges and thereby defining pan-like elements, said plates being positioned in cooperating relation with their flanges extending toward each other in substantially aligned, spaced-apart relation, bats of heat insulating material fitted into said pan-like elements and abutting each other, and a plurality of spaced-apart, tubular metallic members positioned between said elements and bats and rigidly connected at their ends to said flanges at opposite edges of said elements, and the flange at the upper end of one of said elements terminating in an upwardly extending flange for purposes of anchorage and sealing of the unit in assembled relation with other panel units.

References Cited in the file of this patent

UNITED STATES PATENTS

| Number | Name | Date |
|---|---|---|
| 874,939 | Clayton et al. | Dec. 31, 1907 |
| 1,284,758 | Olson | Nov. 12, 1918 |
| 2,158,234 | Griebsch | May 16, 1939 |
| 2,209,564 | Grubb | July 30, 1940 |
| 2,209,816 | Grapp | July 30, 1940 |
| 2,240,487 | Benham | May 6, 1941 |
| 2,327,727 | Loose et al. | Aug. 24, 1943 |
| 2,376,728 | Shaer | May 22, 1945 |